(12) United States Patent
Park et al.

(10) Patent No.: US 9,240,281 B2
(45) Date of Patent: *Jan. 19, 2016

(54) MULTILAYER CERAMIC CAPACITOR AND BOARD FOR MOUNTING THE SAME

(71) Applicant: SAMSUNG ELECTRO-MECHANICS CO., LTD., Suwon, Gyunggi-do (KR)

(72) Inventors: Min Cheol Park, Gyunggi-do (KR); Heung Kil Park, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 237 days.

This patent is subject to a terminal disclaimer.

(21) Appl. No.: 13/950,104

(22) Filed: Jul. 24, 2013

(65) Prior Publication Data

US 2014/0311787 A1 Oct. 23, 2014

(30) Foreign Application Priority Data

Apr. 22, 2013 (KR) .................. 10-2013-0044158

(51) Int. Cl.
| | |
|---|---|
| *H01G 4/228* | (2006.01) |
| *H01G 4/38* | (2006.01) |
| *H01G 4/30* | (2006.01) |
| *H01G 2/06* | (2006.01) |
| *H01G 4/012* | (2006.01) |
| *H01G 4/232* | (2006.01) |

(52) U.S. Cl.
CPC ............... *H01G 4/385* (2013.01); *H01G 2/065* (2013.01); *H01G 4/012* (2013.01); *H01G 4/232* (2013.01); *H01G 4/30* (2013.01)

(58) Field of Classification Search
USPC ............... 361/306.1, 306.3, 303–305, 301.2, 361/301.4, 321.1, 321.2
See application file for complete search history.

(56) References Cited

U.S. PATENT DOCUMENTS

| | | | |
|---|---|---|---|
| 2006/0018082 A1 | 1/2006 | Yamagata et al. | |
| 2009/0244803 A1* | 10/2009 | Lee et al. | 361/301.4 |
| 2015/0014036 A1* | 1/2015 | Park et al. | 174/260 |

FOREIGN PATENT DOCUMENTS

| | | |
|---|---|---|
| JP | 2006-049840 A | 2/2006 |
| JP | 2010-177572 A | 8/2010 |

* cited by examiner

*Primary Examiner* — Nguyen T Ha
(74) *Attorney, Agent, or Firm* — McDermott Will & Emery LLP

(57) ABSTRACT

There is provided a multilayer ceramic capacitor including a ceramic body including a plurality of dielectric layers and having first and second main surfaces, first and second side surfaces, and first and second end surfaces; a first capacitor part including a first internal electrode exposed to the first end surface and a second internal electrode exposed to the second side surface and a second capacitor part including a third internal electrode exposed to the first side surface and a fourth internal electrode exposed to the second end surface; an internal connection conductor exposed to the first and second side surfaces; and first to fourth external electrodes electrically connected to the first to fourth internal electrodes and the internal connection conductor, wherein the internal connection conductor is connected to the first and second capacitor parts in series.

14 Claims, 6 Drawing Sheets

A-A'

MULTILAYER CERAMIC CAPACITOR AND BOARD FOR MOUNTING THE SAME

CROSS-REFERENCE TO RELATED APPLICATIONS

This application claims the priority of Korean Patent Application No. 10-2013-0044158 filed on Apr. 22, 2013, in the Korean Intellectual Property Office, the disclosure of which is incorporated herein by reference.

BACKGROUND OF THE INVENTION

1. Field of the Invention

The present invention relates to a multilayer ceramic capacitor and a board for mounting the same.

2. Description of the Related Art

A multilayer ceramic capacitor, a multilayer chip electronic component, is a chip-shaped condenser mounted on the printed circuit boards of various electronic products such as display devices, for example, liquid crystal displays (LCDs), plasma display panels (PDPs) and the like, as well as computers, smartphones, mobile phones, and the like, to serve to charge and discharge electricity therein.

Since such a multilayer ceramic capacitor (MLCC) has advantages such as a small size, high capacitance, ease of mounting, or the like, such a multilayer ceramic capacitor may be used as a component in various electronic devices.

The multilayer ceramic capacitor may have a structure in which a plurality of dielectric layers and internal electrodes having different polarities are alternately stacked while being interposed between the dielectric layers.

Recently, in the case of multilayer ceramic capacitors used in the automotive and medical fields, demand for high degrees of reliability and relatively long lifespans has increased.

In addition, measures for preventing sudden breakdowns in device functionality or performance degradations in an apparatus or an electronic circuit in advance have been further demanded, and in a passive component used therein, fail safe mechanisms or overload detection functions have been demanded as safety measures against initial failures or incases in which components are exposed to unexpected stress.

Therefore, research into multilayer ceramic capacitors having little influence on degradations in performance and in which overload detecting functions are excellent has been required.

More specifically, even in the case that a crack is generated in a multilayer body due to thermal impact or mechanical stress after a multilayer ceramic capacitor is mounted in an apparatus, a multilayer ceramic capacitor having a significantly reduced influence on operations of an electronic circuit has been demanded.

In addition, a multilayer ceramic capacitor capable of being used to detect leakage current of a condenser or to protect the condenser from over-current or over-voltage has been demanded.

RELATED ART DOCUMENT

Japanese Patent Laid-open Publication No. 2006-049840

SUMMARY OF THE INVENTION

An aspect of the present invention provides a multilayer ceramic capacitor and a board for mounting the same.

According to an aspect of the present invention, there is provided a multilayer ceramic capacitor including: a ceramic body including a plurality of dielectric layers and having first and second main surfaces opposing each other, first and second side surfaces opposing each other, and first and second end surfaces opposing each other; a first capacitor part formed in the ceramic body and including a first internal electrode exposed to the first end surface and a second internal electrode having a lead-out portion exposed to the second side surface and a second capacitor part including a third internal electrode having a lead-out portion exposed to the first side surface and a fourth internal electrode exposed to the second end surface; an internal connection conductor formed in the ceramic body and exposed to the first and second side surfaces; and first to fourth external electrodes formed on external surfaces of the ceramic body and electrically connected to the first to fourth internal electrodes and the internal connection conductor, wherein the internal connection conductor is connected to the first and second capacitor parts in series.

The first and second external electrodes may be disposed on the first and second end surfaces of the ceramic body opposing each other, and the third and fourth external electrodes may be disposed on the first and second side surfaces of the ceramic body opposing each other.

The internal connection conductor may be connected to the second internal electrode via the fourth external electrode.

The internal connection conductor may be connected to the third internal electrode via the third external electrode.

Equivalent series resistance (ESR) of the multilayer ceramic capacitor may be controlled by the internal connection conductor.

The equivalent series resistance (ESR) of the multilayer ceramic capacitor may be 0.1 to 5Ω.

The first and second capacitor parts may be connected to each other in series in the multilayer ceramic capacitor.

According to an aspect of the present invention, there is provided a board for mounting a multilayer ceramic capacitor, the board including: a printed circuit board having first and second electrode pads formed thereon; and a multilayer ceramic capacitor mounted on the printed circuit board, wherein the multilayer ceramic capacitor includes a ceramic body including a plurality of dielectric layers and having first and second main surfaces opposing each other, first and second side surfaces opposing each other, and first and second end surfaces opposing each other, a first capacitor part formed in the ceramic body and including a first internal electrode exposed to the first end surface and a second internal electrode having a lead-out portion exposed to the second side surface and a second capacitor part including a third internal electrode having a lead-out portion exposed to the first side surface and a fourth internal electrode exposed to the second end surface, an internal connection conductor formed in the ceramic body and exposed to the first and second side surfaces, and first to fourth external electrodes formed on external surfaces of the ceramic body and electrically connected to the first to fourth internal electrodes and the internal connection conductor, the internal connection conductor being connected to the first and second capacitor parts in series.

The first and second external electrodes may be disposed on the first and second end surfaces of the ceramic body opposing each other, and the third and fourth external electrodes may be disposed on the first and second side surfaces of the ceramic body opposing each other.

The internal connection conductor may be connected to the second internal electrode via the fourth external electrode.

The internal connection conductor may be connected to the third internal electrode via the third external electrode.

Equivalent series resistance (ESR) of the multilayer ceramic capacitor may be controlled by the internal connection conductor.

The equivalent series resistance (ESR) of the multilayer ceramic capacitor may be 0.1 to 5Ω.

The first and second capacitor parts may be connected to each other in series in the multilayer ceramic capacitor.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

Directions of a hexahedron will be defined in order to clearly describe the embodiments of the present invention. L, W and T shown in the accompanying drawings refer to a length direction, a width direction, and a thickness direction, respectively. Here, the thickness direction may be the same as a direction in which dielectric layers are stacked.

Multilayer Ceramic Capacitor

Hereinafter, embodiments of the present invention will be described in detail with reference to the accompanying drawings.

Figure 1:
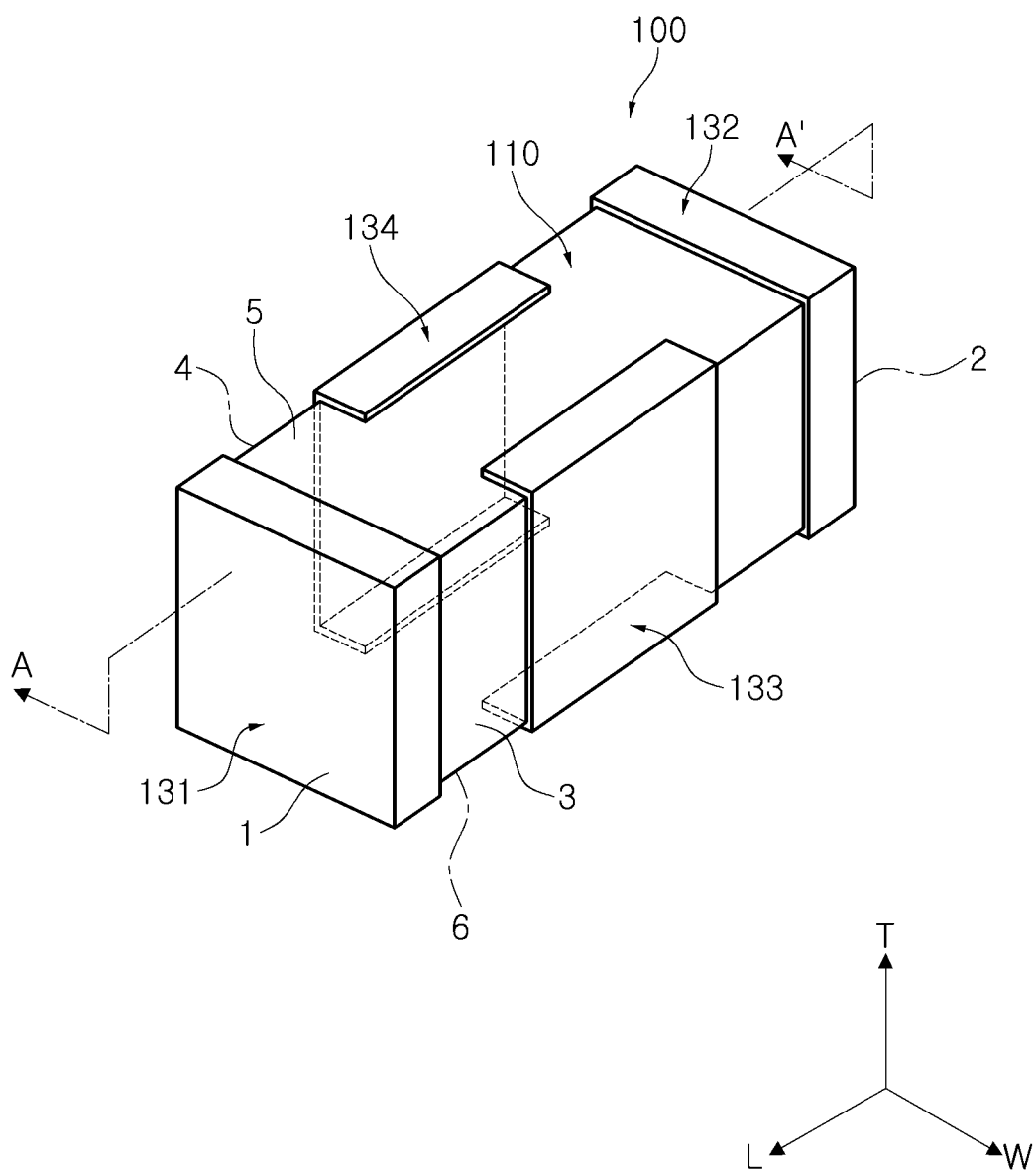
FIG. 1 is a perspective diagram showing a multilayer ceramic capacitor according to an embodiment of the present invention.

FIG. 1 is a perspective diagram showing a multilayer ceramic capacitor according to an embodiment of the present invention.

Figure 2:
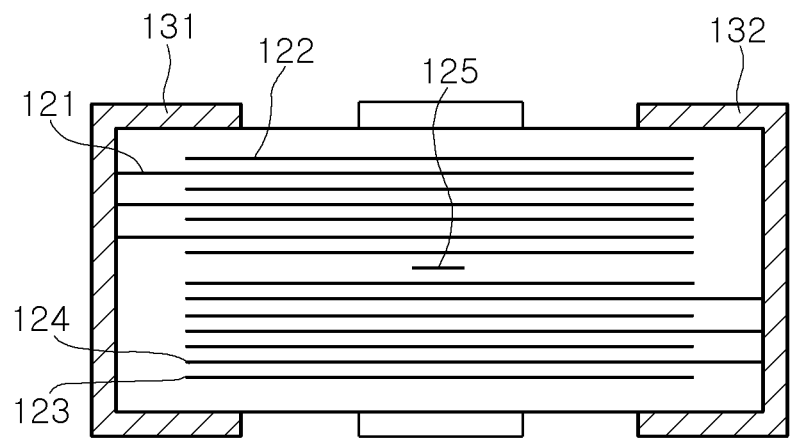
FIG. 2 is a cross-sectional diagram taken along line A-A' of FIG. 1.

FIG. 2 is a cross-sectional diagram taken along line A-A' of FIG. 1.

Figure 3:
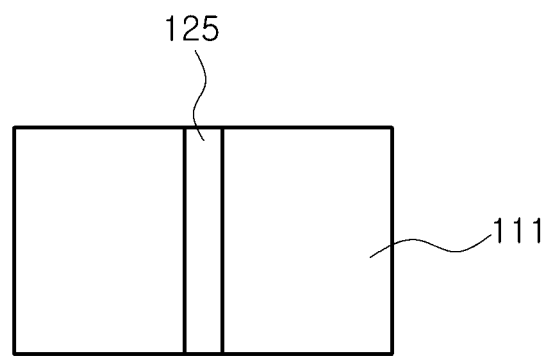
FIG. 3 is a plan diagram showing an internal connection conductor applicable to the multilayer ceramic capacitor shown in FIG. 1.

FIG. 3 is a plan diagram showing an internal connection conductor applicable to the multilayer ceramic capacitor shown in FIG. 1.

Figure 4:
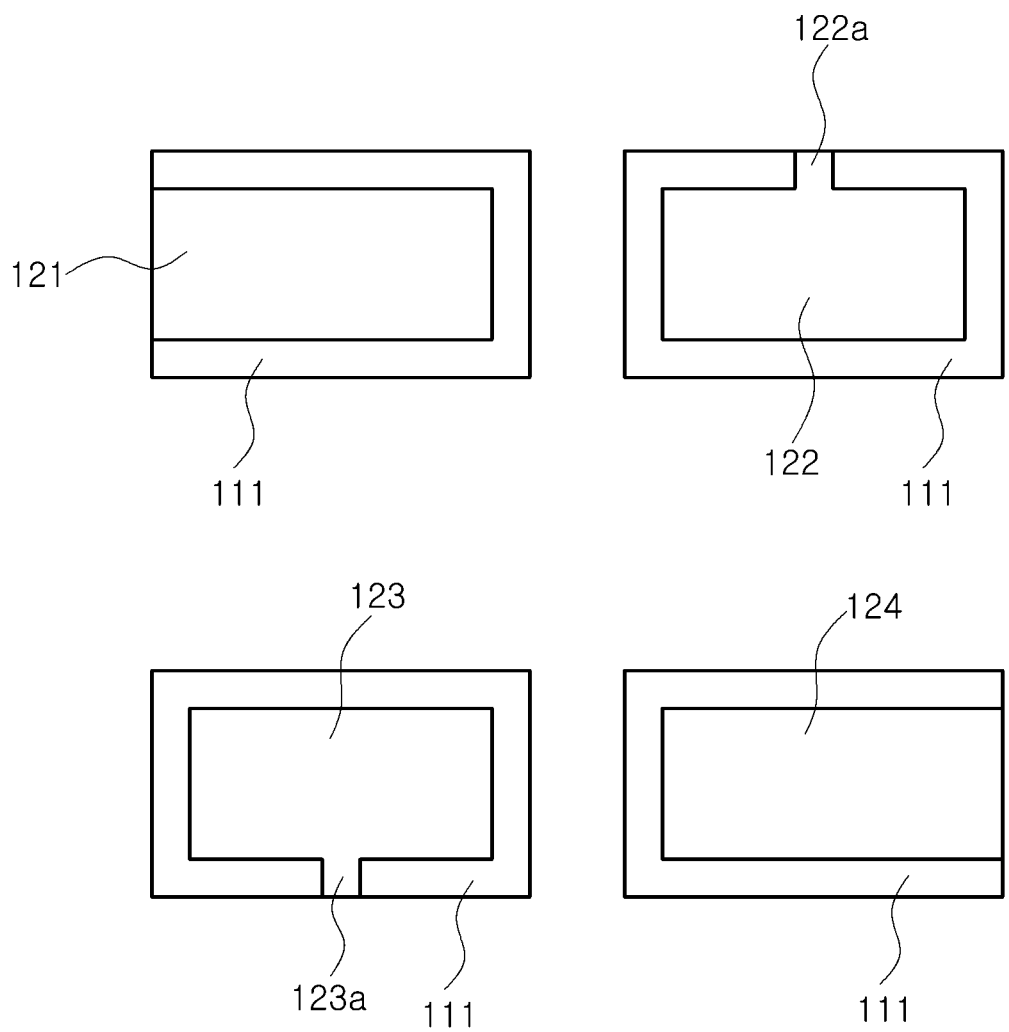
FIG. 4 is a plan diagram showing first to fourth internal electrodes usable together with the internal connection conductor shown in FIG. 3.

FIG. 4 is a plan diagram showing first to fourth internal electrodes usable together with the internal connection conductor shown in FIG. 3.

Referring to FIGS. 1 through 4, the multilayer ceramic capacitor 100 according to the embodiment of the present invention may include a ceramic body 110 including a plurality of dielectric layers 111 and having first and second main surfaces opposing each other, first and second side surfaces opposing each other, and first and second end surfaces opposing each other.

In the present embodiment, the ceramic body 110 may have first and second main surfaces 5 and 6 opposing each other, and first and second side surfaces 3 and 4 and first and second end surfaces 1 and 2 that connect the first and second main surfaces to each other.

A shape of the ceramic body 110 is not particularly limited, but may be a hexahedral shape as shown in FIG. 1.

The ceramic body 110 may be formed by stacking the plurality of dielectric layers, and a plurality of internal electrodes 121 to 124 (sequentially first to fourth internal electrodes) may be disposed to be separated from each other, having the dielectric layer therebetween.

The plurality of dielectric layers 111 configuring the ceramic body 110 may be in a sintered state and may be integrated with each other such that a boundary between dielectric layers adjacent to each other may not be readily discerned.

The dielectric layer 111 may be formed by sintering a ceramic green sheet including ceramic powder, an organic solvent, and an organic binder. As the ceramic powder, which is a high k material, a barium titanate ($BaTiO_3$) based material, a strontium titanate ($SrTiO_3$) based material, or the like, may be used. However, the ceramic powder is not limited thereto.

The multilayer ceramic capacitor 100 may include a first capacitor part CI formed in the ceramic body 110 and including the first internal electrode 121 exposed to the first end surface 1 and the second internal electrode 122 having a lead-out portion 122a exposed to the second side surface 4, and a second capacitor part CII including the third internal electrode 123 having a lead-out portion 123a exposed to the first side surface 3 and the fourth internal electrode 124 exposed to the second end surface 2.

According to the embodiment of the present invention, the first to fourth internal electrodes 121 to 124 may be formed of a conductive paste including a conductive metal.

The conductive metal is not particularly limited, but may be nickel (Ni), copper (Cu), palladium (Pd), or an alloy thereof.

An internal electrode layer may be printed on a ceramic green sheet configuring the dielectric layer using the conductive paste by a printing method such as a screen printing method or a gravure printing method.

The ceramic green sheets having the internal electrode printed thereon may be alternately stacked and fired to form the ceramic body.

In addition, the multilayer ceramic capacitor 100 may include an internal connection conductor 125 disposed in the ceramic body 110, having the dielectric layer 111 therebetween.

The internal connection conductor 125 is not particularly limited but may be formed of, for example, a conductive paste including a conductive metal, similarly to the first to fourth internal electrodes 121 to 124.

The conductive metal is not particularly limited, but may be nickel (Ni), copper (Cu), palladium (Pd), or an alloy thereof.

In addition, the multilayer ceramic capacitor 100 may include first to fourth external electrodes 131 to 134 formed on external surfaces of the ceramic body 110 and electrically connected to the first to fourth internal electrodes 121 to 124 and the internal connection conductor 125.

The first and second external electrodes 131 and 132 may be disposed on the first and second end surfaces 1 and 2 of the ceramic body 110 opposing each other, and the third and fourth external electrodes 133 and 134 may be disposed on the first and second side surfaces 3 and 4 opposing each other.

According to the embodiment of the present invention, it may be understood that two external electrodes 133 and 134 except for the first and second external electrodes 131 and 132 used as external terminals for connection with a power line are used as external electrodes for controlling equivalent series resistance (ESR).

However, since the first and second external electrodes used as the external terminals may be optionally selected so as to be appropriate for the required ESR characteristics, the first and second external electrodes are not particularly limited.

In addition, the third and fourth external electrodes 133 and 134, t the electrodes for controlling the ESR, may be connected to a detection circuit to thereby be used to detect leakage current.

The first to fourth external electrodes 131 to 134 may be formed of a conductive paste including a conductive metal.

The conductive metal may be nickel (Ni), copper (Cu), tin (Sn), or an alloy thereof, but is not limited thereto.

The conductive paste may further include an insulating material. The insulating material may be, for example, glass, but is not limited thereto.

A method of forming the first to fourth external electrodes 131 to 134 is not particularly limited. That is, the first to fourth external electrodes 131 to 134 may be formed by dipping the ceramic body or be formed by a method such as a plating method, or the like.

The multilayer ceramic capacitor 100 is a four-terminal capacitor having a total of four external electrodes, but the present invention is not limited thereto.

Hereinafter, among the configurations of the multilayer ceramic capacitor 100 according to the embodiment of the present invention, the internal electrodes 121 to 124, the internal connection conductor 125, and the external electrodes 131 to 134 will be described in detail with reference to FIGS. 2 through 4.

The first capacitor part CI may be formed in the ceramic body 110 and include the first internal electrode 121 exposed to the first end surface 1 and the second internal electrode 122 having the lead-out portion 122a exposed to the second side surface 4 to form capacitance.

In addition, the second capacitor part CII may include the third internal electrode 123 having the lead-out portion 123a exposed to the first side surface 3 and the fourth internal electrode 124 exposed to the second end surface 2 to form the capacitance.

The first and second capacitor parts CI and CII may be disposed in the ceramic body 110 without particular limitations, and in order to implement a target capacitance value, a plurality of first and second capacitor parts may be stacked.

According to the embodiment of the present invention, the first and second capacitor parts CI and CII may be connected to each other in series in the multilayer ceramic capacitor 100.

The first to fourth internal electrodes 121 to 124 may be alternately disposed together with the internal connection conductor 125, having the dielectric layer 111 therebetween.

Although one internal connection conductor 125 is shown in FIG. 3, the internal connection conductor having at least one polarity may be provided in plural.

Similarly, the number of each of the first to fourth internal electrodes 121 to 124 shown in FIG. 4 is one, but actually, the internal electrode of a specific group may be provided in plural.

Meanwhile, the internal electrodes and the internal connection conductor may be stacked in a sequence shown in FIGS. 3 and 4 or be stacked in various sequences, as needed.

For example, as shown in FIG. 2, the internal connection conductor 125 may be disposed between the first and second capacitor parts CI and CII.

Particularly, the required ESR characteristics may be more precisely controlled by changing a width, a length, and the number of layers of the internal connection conductor 125.

According to the embodiment of the present invention, the internal connection conductor 125 may be connected to the second internal electrode 122 via the fourth external electrode 134.

In addition, according to the embodiment of the present invention, the internal connection conductor 125 may be connected to the third internal electrode 123 via the third external electrode 133.

According to the present embodiment, the ESR of the multilayer ceramic capacitor 100 may be controlled by the internal connection conductor.

According to the present embodiment, the ESR of the multilayer ceramic capacitor 100 may be 0.1 to 5Ω.

As described above, the ESR of the multilayer ceramic capacitor 100 is controlled to be 0.1 to 5Ω, such that impedance in a high frequency region may not be increased, thereby allowing a ripple removal effect or noise removal effect not to be decreased.

In addition, ESR may have excellent effect as resistance with a range in which leakage current or over current may be easily detected.

In the case in which the ESR of the multilayer ceramic capacitor 100 is less than 0.1Ω, the leakage current or over current may not be detected.

In addition, in the case in which the ESR of the multilayer ceramic capacitor 100 is more than 5Ω, the impedance in the high frequency region may be increased, the ripple removal effect or noise removal effect may be decreased.

A pattern shape of the internal connection conductor 125 shown in FIG. 3 is only an example according to the embodiment of the present invention, and the internal connection conductor 125 may have various pattern shapes in order to control the ESR.

For example, the internal connection conductor 125 may have the same pattern shapes as those of the first to fourth internal electrodes 121 to 124 as shown in FIG. 4.

According to the embodiment of the present invention, the ESR of the multilayer ceramic capacitor may be controlled by the internal connection conductor 125. Particularly, the internal connection conductor 125 may be connected to a detection circuit to thereby be used to detect the leakage current.

That is, the first capacitor part CI including the first and second internal electrodes 121 and 122 and the second capacitor part CII including the third and fourth internal electrodes 123 and 124 may be connected to each other in series, as described below.

In addition, the internal connection conductor 125 may be connected to the first and second capacitor parts CI and CII in series.

Due to the connection as described above, the ESR of the multilayer ceramic capacitor may be controlled by the internal connection conductor 125, and the internal connection conductor 125 may be connected to the detection circuit to thereby be used to detect the leakage current.

In addition, in the present embodiment, since the first and second capacitor parts CI and CII are disposed in series with each other, even when insulation resistance of one of the capacitor parts may be decreased, insulation resistance may be maintained, such that the reliability may be excellent.

In addition, according to the related art, a separate resistor is required at the outside in order to detect leakage current, but according to the embodiment of the present invention, since the leakage current may be detected using an internal resistor in the multilayer ceramic capacitor 100, a manufacturing cost and a mounting space of the component may be decreased.

Figure 5:
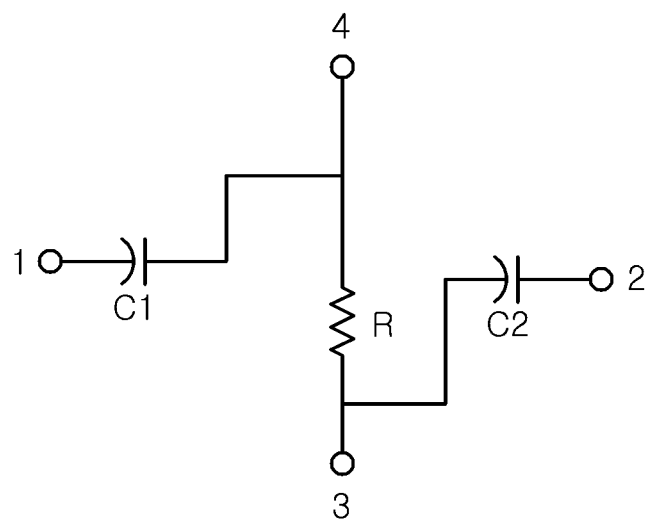
FIG. 5 is an equivalent circuit diagram of the multilayer ceramic capacitor shown in FIG. 1.

FIG. 5 is an equivalent circuit diagram of the multilayer ceramic capacitor shown in FIG. 1.

Referring to FIG. 5, the first capacitor part CI including the first and second internal electrodes 121 and 122 and the second capacitor part CII including the third and fourth internal electrodes 123 and 124 may be connected to each other in series.

In addition, the internal connection conductor 125 may be connected to the first and second capacitor parts CI and CII in series.

As described above, the multilayer ceramic capacitor according to the embodiment of the present invention may have two types of capacitors and one type of resistor and control respective values thereof.

The multilayer ceramic capacitor according to the embodiment of the present invention has a structure configured of the internal electrodes 121 to 124, the internal connection conductor 125, and the external electrodes as described above, such that the leakage current may be easily detected by the internal resistor of the multilayer ceramic capacitor, and even when the insulation resistance is suddenly decreased by a crack due to external stress, or the like, the reliability may not be decreased, thereby obtaining the excellent reliability, unlike a structure according to the related art.

That is, according to the embodiment of the present invention, since the capacitors are disposed in series, even when the insulation resistance of one capacitor is decreased, the insulation resistance may be maintained, such that the reliability may be excellent.

In addition, according to the related art, the separate resistor is required at the outside in order to detect the leakage current, but according to the embodiment of the present invention, since the leakage current may be detected using the internal resistor in the multilayer ceramic capacitor, the manufacturing cost and the mounting space of the components may be decreased.

Board for Mounting a Multilayer Ceramic Capacitor

Figure 6:
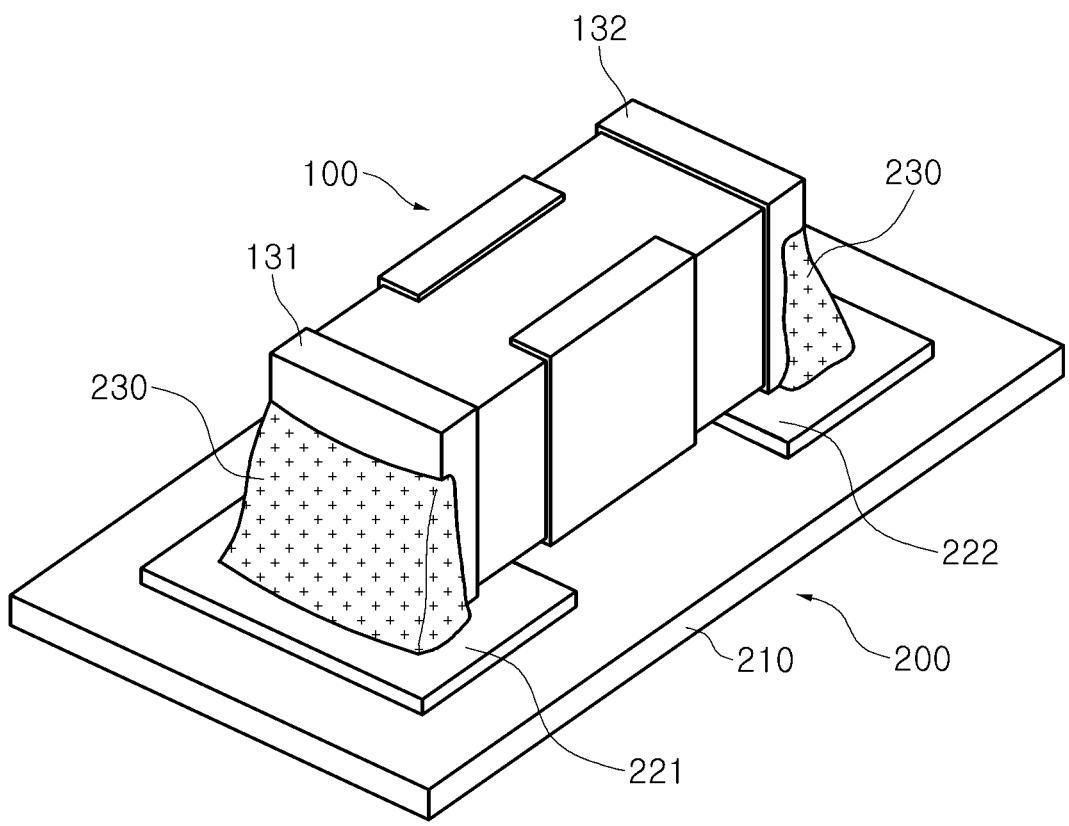
FIG. 6 is a perspective diagram showing a form in which the multilayer ceramic capacitor of FIG. 1 is mounted on a printed circuit board.
Figure 6:
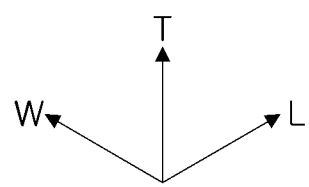

FIG. 6 is a perspective diagram showing a form in which the multilayer ceramic capacitor of FIG. 1 is mounted on a printed circuit board.

Figure 7:
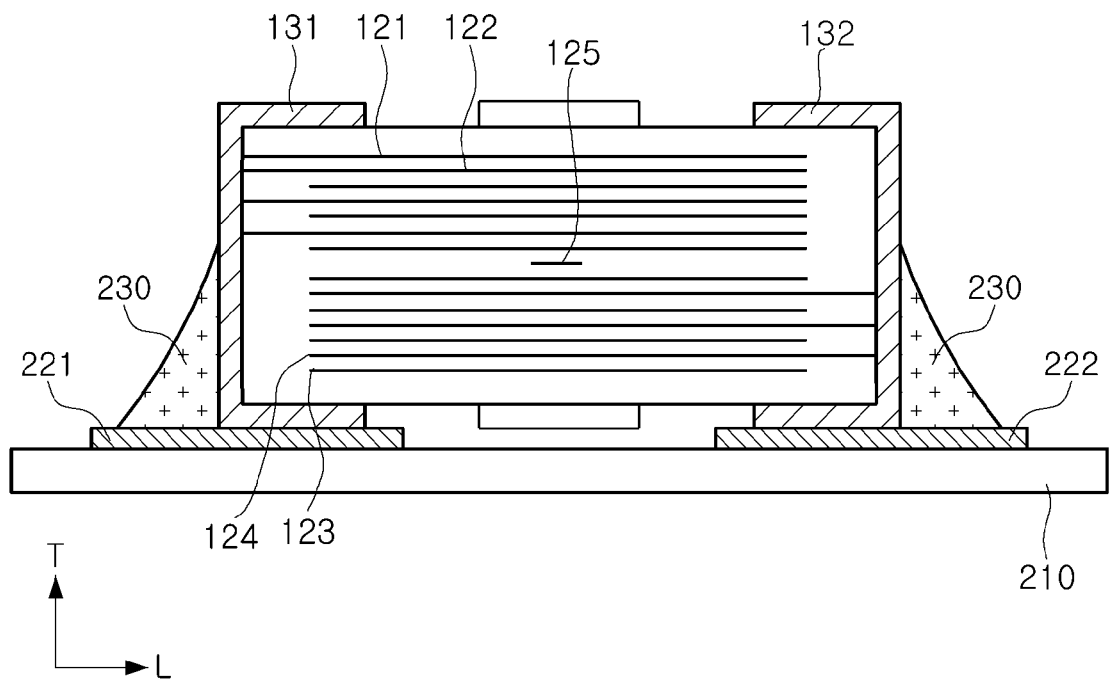
FIG. 7 is a cross-sectional diagram of the multilayer ceramic capacitor of FIG. 6 and the printed circuit board taken in a length direction.

FIG. 7 is a cross-sectional diagram of the multilayer ceramic capacitor and the printed circuit board of FIG. 6 taken in a length direction.

Referring to FIGS. 6 and 7, a board 200 for mounting a multilayer ceramic capacitor 100 according to the embodiment of the present invention may include a printed circuit board 210 on which the multilayer ceramic capacitor 100 is horizontally mounted and first and second electrode pads 221 and 222 formed on the printed circuit board 210 to be spaced apart from each other.

In this case, the multilayer ceramic capacitor 100 may be electrically connected to the printed circuit board 210 by soldering 230 in a state in which first and second external electrodes 131 and 132 are positioned on the first and second electrode pads 221 and 222 so as to contact each other, respectively.

The multilayer ceramic capacitor 100 may include a ceramic body including a plurality of dielectric layers and having first and second main surfaces opposing each other, first and second side surfaces opposing each other, and first and second end surfaces opposing each other, a first capacitor part formed in the ceramic body and including a first internal electrode exposed to the first end surface and a second internal electrode having a lead-out portion exposed to the second side surface and a second capacitor part including a third internal electrode having a lead-out portion exposed to the first side surface and a fourth internal electrode exposed to the second end surface, an internal connection conductor formed in the ceramic body and exposed to the first and second side surfaces, and first to fourth external electrodes formed on external surfaces of the ceramic body and electrically connected to the first to fourth internal electrodes and the internal connection conductor, wherein the first to fourth internal electrodes and the internal connection conductor are electrically connected to each other via the first to fourth external electrodes.

Except for the description described above, a description of features overlapped with those of the above-mentioned multilayer ceramic capacitor according to the embodiment of the present invention will be omitted.

As set forth above, according to the embodiments of the present invention, the leakage current may be easily detected by the internal resistor of the multilayer ceramic capacitor, and even when the insulation resistance is suddenly decreased by a crack due to external stress, or the like, the reliability may not be decreased, such that the reliability may be excellent.

That is, according to the embodiment of the present invention, since the capacitors are disposed in series, even when the insulation resistance of one capacitor is decreased, the insulation resistance may be maintained, such that the reliability may be excellent.

In addition, according to the related art, the separate resistor is required at the outside in order to detect the leakage current, but according to the embodiments of the present invention, since the leakage current may be detected using the internal resistor in the multilayer ceramic capacitor, the manufacturing cost and the mounting space of the component may be decreased.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body including a plurality of dielectric layers and having first and second main surfaces opposing each other, first and second side surfaces opposing each other, and first and second end surfaces opposing each other;
   a first capacitor part formed in the ceramic body and including a first internal electrode exposed to the first end surface and a second internal electrode having a lead-out portion exposed to the second side surface and a second capacitor part including a third internal electrode having a lead-out portion exposed to the first side surface and a fourth internal electrode exposed to the second end surface;
   an internal connection conductor formed in the ceramic body and exposed to the first and second side surfaces; and first to fourth external electrodes formed on external surfaces of the ceramic body and electrically connected to the first to fourth internal electrodes and the internal connection conductor,
wherein the internal connection conductor is connected to the first and second capacitor parts in series.

2. The multilayer ceramic capacitor of claim 1, wherein the first and second external electrodes are disposed on the first and second end surfaces of the ceramic body opposing each other, and the third and fourth external electrodes are disposed on the first and second side surfaces of the ceramic body opposing each other.

3. The multilayer ceramic capacitor of claim 1, wherein the internal connection conductor is connected to the second internal electrode via the fourth external electrode.

4. The multilayer ceramic capacitor of claim 1, wherein the internal connection conductor is connected to the third internal electrode via the third external electrode.

5. The multilayer ceramic capacitor of claim 1, wherein equivalent series resistance (ESR) thereof is controlled by the internal connection conductor.

6. The multilayer ceramic capacitor of claim 1, wherein the equivalent series resistance (ESR) thereof is 0.1 to 5Ω.

7. The multilayer ceramic capacitor of claim 1, wherein the first and second capacitor parts are connected to each other in series in the multilayer ceramic capacitor.

8. A board for mounting a multilayer ceramic capacitor, the board comprising:
a printed circuit board having first and second electrode pads formed thereon; and
a multilayer ceramic capacitor mounted on the printed circuit board,
wherein the multilayer ceramic capacitor includes a ceramic body including a plurality of dielectric layers and having first and second main surfaces opposing each other, first and second side surfaces opposing each other, and first and second end surfaces opposing each other, a first capacitor part formed in the ceramic body and including a first internal electrode exposed to the first end surface and a second internal electrode having a lead-out portion exposed to the second side surface and a second capacitor part including a third internal electrode having a lead-out portion exposed to the first side surface and a fourth internal electrode exposed to the second end surface, an internal connection conductor formed in the ceramic body and exposed to the first and second side surfaces, and first to fourth external electrodes formed on external surfaces of the ceramic body and electrically connected to the first to fourth internal electrodes and the internal connection conductor, the internal connection conductor being connected to the first and second capacitor parts in series.

9. The board of claim 8, wherein the first and second external electrodes are disposed on the first and second end surfaces of the ceramic body opposing each other, and the third and fourth external electrodes are disposed on the first and second side surfaces of the ceramic body opposing each other.

10. The board of claim 8, wherein the internal connection conductor is connected to the second internal electrode via the fourth external electrode.

11. The board of claim 8, wherein the internal connection conductor is connected to the third internal electrode via the third external electrode.

12. The board of claim 8, wherein equivalent series resistance (ESR) of the multilayer ceramic capacitor is controlled by the internal connection conductor.

13. The board of claim 8, wherein the equivalent series resistance (ESR) of the multilayer ceramic capacitor is 0.1 to 5Ω.

14. The board of claim 8, wherein the first and second capacitor parts are connected to each other in series in the multilayer ceramic capacitor.

* * * * *